US008223232B2

(12) United States Patent  
Tsai

(10) Patent No.: US 8,223,232 B2  
(45) Date of Patent: Jul. 17, 2012

(54) IMAGE PROCESSING DEVICE AND IMAGE PROCESSING METHOD

(75) Inventor: Chi-Yi Tsai, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 311 days.

(21) Appl. No.: 12/721,033

(22) Filed: Mar. 10, 2010

(65) Prior Publication Data

US 2010/0231760 A1    Sep. 16, 2010

(30) Foreign Application Priority Data

Mar. 13, 2009    (TW) .............................. 98108178 A

(51) Int. Cl.  
*H04N 5/335*    (2011.01)
(52) U.S. Cl. ........................................ 348/280; 348/241
(58) Field of Classification Search .................. 348/272, 348/275, 277, 280, 222.1, 241  
See application file for complete search history.

(56) References Cited

U.S. PATENT DOCUMENTS

| 4,223,339 | A | 9/1980 | Lagoni et al. |
| 6,160,593 | A | 12/2000 | Nakakuki |
| 6,535,632 | B1 | 3/2003 | Park et al. |
| 6,885,398 | B1* | 4/2005 | Sladen .......................... 348/273 |
| 7,113,206 | B2 | 9/2006 | Nakakuki |
| 2004/0150732 | A1* | 8/2004 | Yamanaka .................... 348/272 |
| 2005/0212933 | A1* | 9/2005 | Miyanohara .................. 348/272 |
| 2011/0134291 | A1* | 6/2011 | Rueckert et al. .............. 348/280 |

FOREIGN PATENT DOCUMENTS

CN    1662071 A    8/2005

* cited by examiner

*Primary Examiner* — Tuan Ho  
(74) *Attorney, Agent, or Firm* — Muncy, Geissler, Olds & Lowe, PLLC

(57) ABSTRACT

An image processing method includes the following steps. First, noise of a first image is filtered, and the first image is converted to obtain a luminance signal. Second, the first image is stored and outputted. Third, a color space converting process is performed upon the first image according to the luminance signal to obtain a second image. Fourth, a linear computing is performed upon the second image to obtain a third image. Fifth, the color space converting process is performed according to a third image and the luminance signal to obtain and output a fourth image. Sixth, an error compensation is performed upon the first image and the fourth image, and the fourth image is outputted. Accordingly, a linear operating process and error compensation processing is performed upon the single image to filter the noise of the image, and thus a load of the system is reduced.

20 Claims, 3 Drawing Sheets

IMAGE PROCESSING DEVICE AND IMAGE PROCESSING METHOD

CROSS REFERENCE TO RELATED APPLICATIONS

This Non-provisional application claims priority under 35 U.S.C. §119(a) on Patent Application No(s). 098108178 filed in Taiwan, Republic of China on Mar. 13, 2009, the entire contents of which are hereby incorporated by reference.

BACKGROUND OF THE INVENTION

1. Field of Invention

The invention relates to an image processing device and an image processing method and, more particularly, to an image processing device and an image processing method which effectively filter image noise.

2. Related Art

With highly development of display systems with multimedia display interfaces, image transmission technology and image broadcast technology are significantly progressing. As for image transmission technology, real-time image display becomes a popular display mode presently, which implements images that are captured by web cameras and are played at the display system immediately.

However, when the web camera or the display system (such as a liquid crystal display (LCD)) is used in an outdoor environment, an environment with insufficient backlight, or an environment with dim light source, the images are inevitably suffered from noise. Therefore, the images displayed at the display system may be greatly distorted and bad video quality is then provided.

In general, to improve the video quality, it is specific functional hardware components (such as an integrated circuit (IC)) that developers spend a lot of time and money to develop. Usually, developers dispose extra developed ICs in the web camera or the display system to rectify the images captured and to be displayed. The IC requires an application specific integrated circuit (ASIC) performing an operation processing to filter the noise, a memory unit and a memory control circuit to store image in the operation processing.

The research and design for the ASIC and a manufacture process consume a lot of time and cost. Furthermore, the IC for processing the image requires specific cooperating memory units and memory control circuits, this leads to a far higher production cost, let along consumes a great deal of power as well.

Moreover, normally, the filtering or analyzing of the image noise is usually performed on a currently displayed image and a former image, via a non-linear computing operation. Thus, when it comes to filtering or analyzing mass of images, operation complexity is increased, but also the hardware loading is rising hastily, eventually reduce the efficiency of the system.

SUMMARY OF THE INVENTION

Present invention provides an image processing device and an image processing method which dismisses complex hardware operation and filters noise of the image via a linear computing.

According to an aspect of the invention, the image processing method includes the following steps. First, filtering the noise of a first image and converting the first image to obtain a luminance signal, wherein the first image is defined in a first color space. Second, storing and outputting the first image. Third, performing a color space converting process upon the first image according to the luminance signal to obtain a second image, and wherein the second image is defined in a second color space. Fourth, performing a linear computing upon the second image to obtain a third image. Fifth, performing the color space converting process according to a third image and the luminance signal to obtain and output a fourth image, and wherein the fourth image is defined in the first color space. Sixth, performing an error compensation upon the first image and the fourth image, and outputting the fourth image.

According to another aspect of the invention, the image processing device includes a noise filtering and converting module, a storing module, a first color space converting module, a linear processing module, a second color space converting module, and an error compensation module. The noise filtering and converting module filters noise of a first image and converts the first image to obtain the luminance signal, and the first image is defined in the first color space. The storing module stores and outputs the first image. The first color space converting module performs the color space converting process upon the first image according to the luminance signal to obtain the second image, and the second image is defined in the second color space. The linear processing module performs the linear computing upon the second image to obtain the third image, and the third image is defined in the second color space. The second color space converting module performs the color space converting process according to the third image and the luminance signal to obtain a fourth image, and the fourth image is defined in the first color space. The error compensation module performs the error compensation upon the first image and the fourth image and outputs the fourth image.

According to an embodiment of the invention, the error compensation module outputs the fourth image to a display system according to an operation result.

According to an embodiment of the invention, the error compensation module outputs the fourth image to the storing module according to the operation result to replace the first image in the storing module with the fourth image.

According to an embodiment of the invention, the error compensation is a mean squared error (MSE) computing.

According to an embodiment of the invention, the linear computing includes utilizing a linear low-pass filter to process the second image to obtain the third image.

According to an embodiment of the invention, the first color space is a RGB color space, and the second color space is a chromatic aberration color space.

To sum up, the image processing device and the image processing method according to the invention utilize the image processing unit to perform the linear computing and the error compensation upon a single image, and utilize a recursive operation to filter the noise in the image. Different from conventional technology, with the image processing device and the image processing method according to the invention, an user do not need to extraordinarily develop specific functional hardware components. Since to the image processing device is not utilizes two or more images to perform the non-linear computing processing, load of the system is reduced to improve the efficient of the system, and otherwise, the cost of the hardware components is saved.

These and other features, aspects and advantages of the present invention will become better understood with regard to the following description, appended claims, and accompanying drawings.

DETAILED DESCRIPTION OF THE INVENTION

An image processing device and an image processing method according to an embodiment of the invention are illustrated hereinafter accompanying relating drawings.

Figure 1:
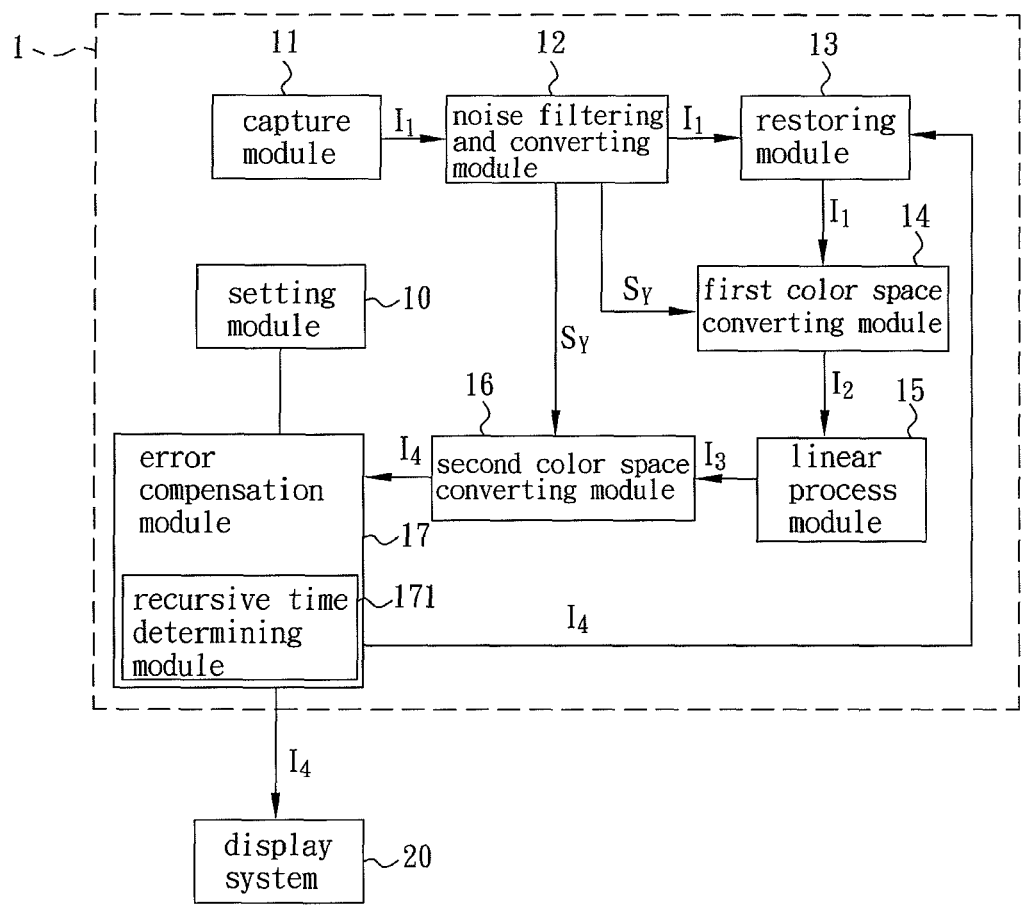
FIG. 1 is a block diagram showing an image processing device according to an embodiment of the invention.

In FIG. 1, an image processing device 1 according to an embodiment of the invention is disposed in a computer including a main body and a display system. The image processing device 1 includes a capture module 11, a noise filtering and converting module 12, a storing module 13, a first color space converting module 14, a linear processing module 15, a second color space converting module 16, and an error compensation module 17.

The capture module 11 may be a web camera, and it captures a first image $I_1$ and transmits the first image $I_1$ to a central processing unit (CPU) or a graphics processing unit (GPU) to perform subsequent processing. In this embodiment, the first image $I_1$ is not limited to be captured by the web camera, and it also may be from a hard disk.

The noise filtering and converting module 12 receives the first image $I_1$, filters noise for the first image $I_1$, and converts the first image $I_1$ to obtain a luminance signal $S_Y$. The noise filtering and converting module 12 outputs the first image $I_1$ and the luminance signal $S_Y$, respectively. The first image $I_1$ is defined in a first color space. In this embodiment, the first color space may be a RGB color space or a CMYK color space.

Additionally, in this embodiment, the luminance signal $S_Y$ includes a luminance domain represented by luminance values corresponding to pixels in the first image $I_1$. Furthermore, the noise filtering and converting module 12 may perform noise filtering operation upon the first image $I_1$ first after receiving the first image $I_1$, and then converts the first image $I_1$ to the luminance signal $S_Y$, and it also may convert the first image $I_1$ to the luminance signal $S_Y$ first after receiving the first image $I_1$ and then perform the noise filtering operation upon the luminance signal $S_Y$, which is not limited herein. The main purpose is to obtain the luminance signal $S_Y$ processed via the noise filtering operation.

The storing module 13 stores the first image $I_1$ and outputs the first image $I_1$. In this embodiment, the noise filtering and converting module 12 outputs the first image $I_1$ to the storing module 13. Then, the storing module 13 stores the first image $I_1$, and then it outputs the first image $I_1$.

The first color space converting module 14 performs a color space converting process upon the first image $I_1$ according to the luminance signal $S_Y$ to obtain a second image $I_2$, and the second image $I_2$ is defined in a second color space. In this embodiment, the second color space is a chromatic aberration color space such as a YCrCb color space, a YUV color space, a YPbPr color space, or a (R-Y)(G-Y)(B-Y) color space.

The linear processing module 15 performs a linear computing upon the second image $I_2$ to obtain a third image $I_3$. The third image $I_3$ is defined in the second color space. Most noise in the image is a high frequency signal. Therefore, in this embodiment, the linear processing module 15 may be a linear low-pass filtering processing module filtering the high frequency noise in the second image $I_2$ to obtain the third image $I_3$ with low frequency information.

The second color space converting module 16 performs a color space converting process according to the third image $I_3$ and the luminance signal $S_Y$ to obtain a fourth image $I_4$, and the fourth image $I_4$ is the first color space.

The color space converting modules as stated above convert image data representing the pixels in the image, respectively.

The error compensation module 17 performs an error compensation upon the first image $I_1$ and the fourth image $I_4$ and outputs the fourth image $I_4$. In this embodiment, the error compensation may be a MSE computing.

The procedure that computing performed in the storing module 13 and then in the error compensation module 17 is defined as a recursive operation. The error compensation module 17 has a predetermined recursive value, a present recursive value, and a predetermined error value. Additionally, the image processing device 1 according to the embodiment further includes a setting module 10 which sets the predetermined recursive value and the predetermined error value in the error compensation module 17.

The error compensation module 17 further includes a recursive time determining module 171. Before the error compensation module 17 is activated, the recursive time determining module compares the content of the present recursive value with the content of the predetermined recursive value. When the content of the present recursive value is larger than (or equal to) that of the predetermined recursive value, the procedure of the recursive operation is ended, and the fourth image $I_4$ is outputted to a display system 20. When the content of the present recursive value is smaller than that of the predetermined recursive value, the error compensation module 17 continues to perform the error compensation to obtain an operation result, and the error compensation module 17 compares the operation result with the predetermined error value. When the operation result is smaller than (or equal to) the predetermined error value, the procedure of the recursive operation is ended, and the fourth image $I_4$ is outputted to the display system 20. When the operation result is larger than the predetermined error value, the error compensation module 17 updates the content of the present recursive value (such as adding one), and it outputs the fourth image $I_4$ to the storing module 13 to replace the first image $I_1$ stored in the storing module 13. Then, instead of the first image $I_1$, the fourth image $I_4$ performs the recursive operation.

Figure 2:
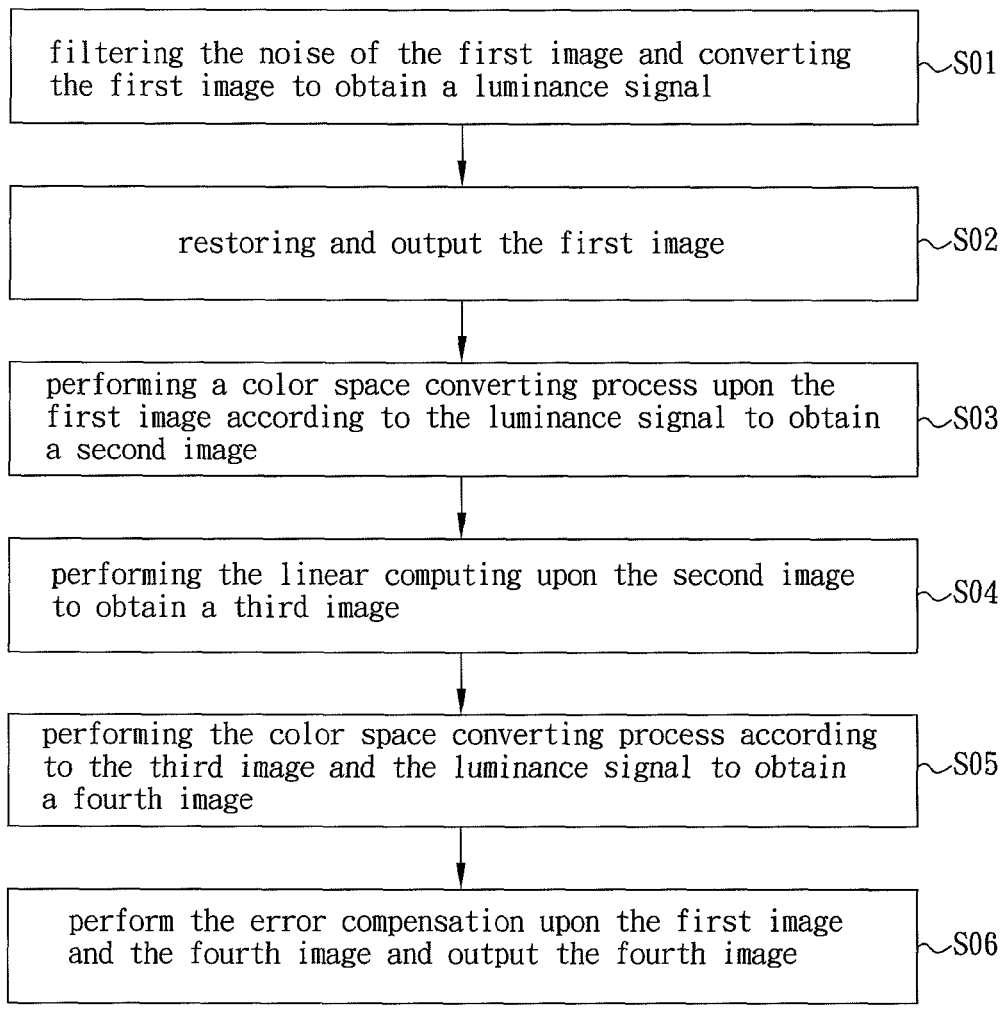
FIG. 2 is a flow chart showing an image processing method according to an embodiment of the invention.

FIG. 2 is an image processing method according to an embodiment of the invention including step S01 to step S06. In this embodiment, the image processing method is used by a web camera cooperating with the computer with a main body and a display system. The image processing method in this embodiment may be operated in the CPU in the main body or the GPU for processing image. In this embodiment, the image processing method is operated in the CPU.

First, the CPU must obtain a first image to process the first image. The first image may be the image captured by the web camera or the image stored in a storage unit (such as a hard disk) of the computer.

In step S01, the noise of the first image is filtered, and the first image is converted to obtain a luminance signal, and the first image is defined in a first color space. In this embodiment, the first color space is the RGB color space or the CMYK color space.

In step S02, the first image is stored and outputted. In this embodiment, the first image is stored in an image storing module.

In step S03, the color space converting process is performed upon the first image according to the luminance signal to obtain a second image, and the second image is defined in a second color space. In this embodiment, the second color space is the chromatic aberration color space such as a YUV color space, a YCbCr color space, a YPbPr color space, or a (R-Y)(G-Y)(B-Y) color space. In step S03, the first image may be converted to the luminance signal after the noise filtering operation is performed upon the first image, and the first image also may be converted to the luminance signal before the noise filtering operation is performed upon the first image, which is not limited herein. The main purpose is to obtain the luminance signal processed via the noise filtering operation.

In step S04, the linear computing is performed upon the second image to obtain a third image. The linear computing may be a linear low-pass filter operation, and it filters the high frequency noise in the second image to obtain the third image.

In step S05, the color space converting process is performed according to the third image and the luminance signal to obtain a fourth image, and the fourth image is the first color space.

In step S06, the error compensation is performed upon the first image and the fourth image, and the fourth image is outputted. The error compensation may be the MSE computing. In this embodiment, if the operation result is smaller than (or equal to) the predetermined error value, the fourth image is outputted to the display system. However, if the operation result is larger than the predetermined error value, the fourth image may be outputted to the storing module to replace the image stored in the storing module, and the fourth image is continue to be performed in step S03.

Figure 3:
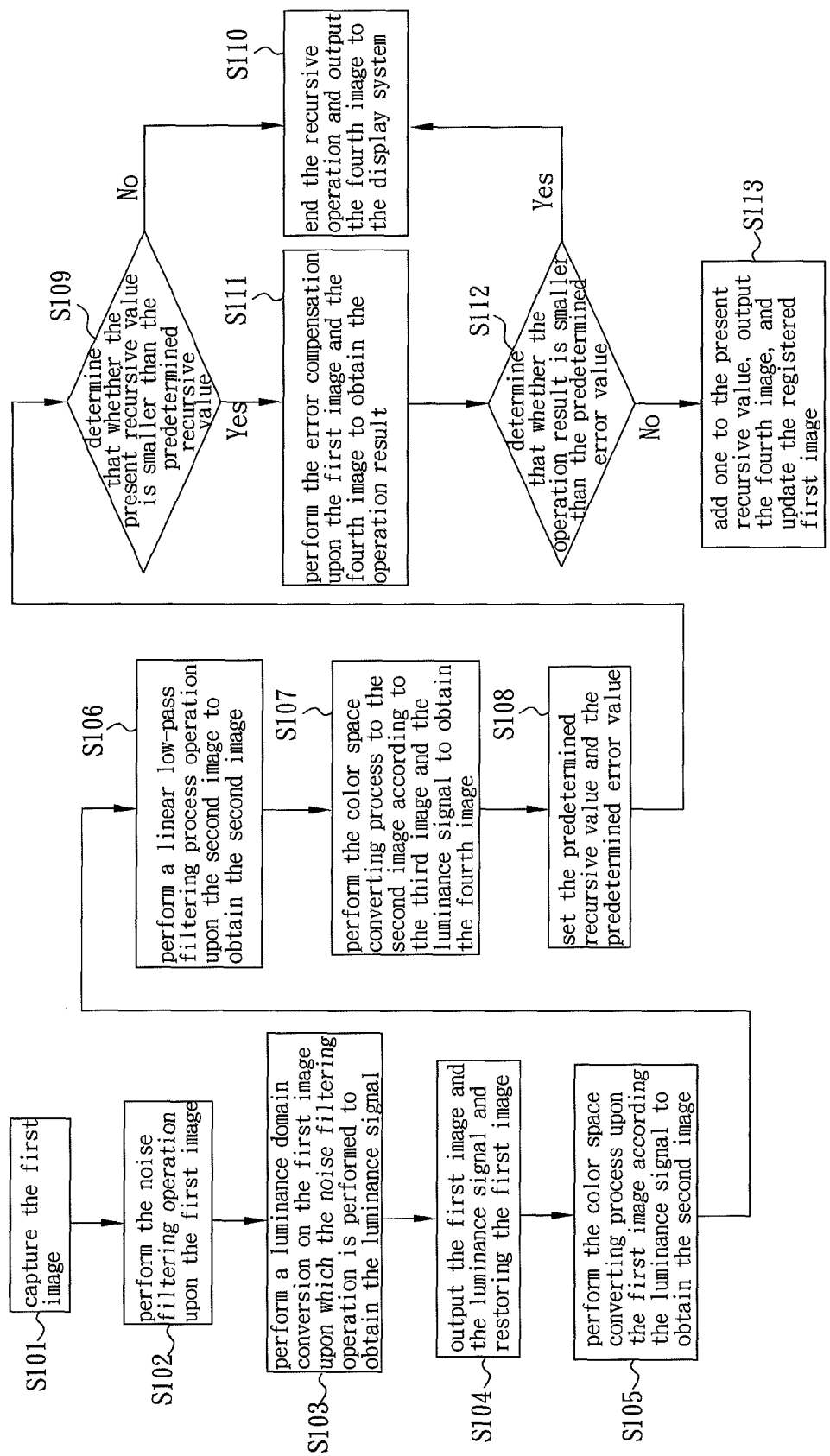
FIG. 3 is a detailed flow chart showing an image processing method according to an embodiment of the invention.

The image processing method according to an embodiment of the invention is illustrated accompanying FIG. 3 and cooperating with the illustration in the above embodiment.

In step S101, the first image is captured and transmitted to the CPU or the GPU to perform subsequent processing.

In step S102, the noise filtering operation is performed upon the first image. In step S103, a luminance domain conversion is performed upon the first image on which the noise filtering operation is performed to obtain the luminance signal. In step S104, the first image and the luminance signal are outputted, and the first image is stored.

In step S105, the color space converting process is performed upon the first image according to the luminance signal to obtain the second image. In step S106, a linear low-pass filtering process operation is performed upon the second image to obtain the third image. In step S107, the color space converting process is performed according to the third image and the luminance signal to obtain the fourth image.

In step S108, the predetermined recursive value and the predetermined error value are set. In step S109, it determines that whether the present recursive value is smaller than the predetermined recursive value. When the present recursive value is smaller than the predetermined recursive value, step S111 is performed. When the present recursive value is larger than (or equal to) the predetermined recursive value, step S110 is performed.

In step S110, the recursive operation is ended, and the fourth image is outputted to the display system. In step S111, the error compensation is performed upon the first image and the fourth image to obtain the operation result. In step S112, it determines that whether the operation result is smaller than the predetermined error value. When the operation result is smaller than (or equal to) the predetermined error value, step S110 is performed. When the operation result is larger than the predetermined error value, step S113 is performed.

In step S113, one is added to the present recursive value, and the fourth image is outputted to replace the stored first image. Then, the fourth image performs step S105.

Determining modes (smaller than, equal to, and larger than) of determining formulas may be designed according to practical demands, which is not limited to the above illustration.

To sum up, the image processing device and the image processing method according to the invention utilize the image processing unit (such as the CPU or the GPU) to perform the linear computing (such as the linear low-pass filtering operation) and the error compensation (such as the mean-square error compensation) to the single image, and utilize a recursive way to filter the noise in the image. In contrast with conventional technology, the image processing device and the image processing method according to the invention do not need to extraordinarily develop the specific functional hardware components (such as the IC), and do not need to utilize two or more images to perform the non-linear computing processing. Thus, the load of the system is reduced to improve the efficiency of the system, and the cost of the hardware components is saved.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An image processing method, comprising:
    filtering noise of a first image and converting the first image to obtain a luminance signal, wherein the first image is defined in a first color space;
    storing and outputting the first image;
    performing a color space converting process upon the first image according to the luminance signal to obtain a second image, wherein the second image is defined in a second color space;
    performing a linear computing upon the second image to obtain a third image, wherein the third image is defined in the second color space;
    performing the color space converting process according to the third image and the luminance signal to obtain a fourth image, wherein the fourth image is defined in the first color space; and
    performing an error compensation upon the first image and the fourth image and outputting the fourth image.

2. The image processing method according to claim 1, wherein the luminance signal is obtained by performing a color image noise filtering operation upon the first image first and performing an image luminance planar conversion subsequently.

3. The image processing method according to claim 1, wherein the luminance signal is obtained by performing an image luminance planar conversion upon the first image first and performing a noise filtering operation subsequently.

4. The image processing method according to claim 1, wherein the linear computing comprises utilizing a linear low-pass filter to process the second image to obtain the third image.

5. The image processing method according to claim 1, wherein the error compensation is a mean-square error compensation.

6. The image processing method according to claim 1, wherein when an operation result of the error compensation is smaller than or equal to a predetermined error value, the fourth image is outputted to a display system.

7. The image processing method according to claim 1, wherein when an operation result of the error compensation is larger than a predetermined error value, the fourth image is outputted to replace the stored first image.

8. The image processing method according to claim 1, wherein the first color space is a RGB color space or a CMYK color space.

9. The image processing method according to claim 1, wherein the second color space is a chromatic aberration color space.

10. The image processing method according to claim 9, wherein the chromatic aberration color space is a YUV color space, a YCbCr color space, a YPbPr color space, or a (R-Y)(G-Y)(B-Y) color space.

11. An image processing device, comprising:
   a noise filtering and converting module filtering noise of a first image and converting the first image to obtain a luminance signal, wherein the first image is defined in a first color space;
   a storing module electrically connected with the noise filtering and converting module, wherein the storing module stores and outputs the first image;
   a first color space converting module electrically connected with the storing module and performing a color space converting process upon the first image according to the luminance signal to obtain a second image, wherein the second image is defined in a second color space;
   a linear processing module electrically connected with the first color space converting module and performing a linear computing upon the second image to obtain a third image, wherein the third image is defined in the second color space;
   a second color space converting module electrically connected with the linear processing module and performing the color space converting process according to the third image and the luminance signal to obtain a fourth image; and
   an error compensation module electrically connected with the second color space converting module, performing an error compensation upon the first image and the fourth image, and outputting the fourth image.

12. The image processing device according to claim 11, further comprising:
   a capture module electrically connected with the noise filtering and converting module, wherein the capture module captures the first image and outputs the first image to the noise filtering and converting module.

13. The image processing device according to claim 12, wherein the error compensation module has a predetermined recursive value, a present recursive value, and a predetermined error value.

14. The image processing device according to claim 13, wherein the error compensation module comprises a recursive time determining module, and the recursive time determining module compares the predetermined recursive value and the present recursive value.

15. The image processing device according to claim 13, wherein the error compensation module compares an operation result of the error compensation with the predetermined error value and outputs the fourth image to a display system or the storing module according to a comparing result.

16. The image processing device according to claim 11, wherein the linear processing module is a linear low-pass filtering processing module.

17. The image processing device according to claim 11, wherein the error compensation module is a mean-square error compensation module.

18. The image processing device according to claim 11, wherein the first color space is a RGB color space or a CMYK color space.

19. The image processing device according to claim 11, wherein the second color space is a chromatic aberration color space.

20. The image processing device according to claim 19, wherein the chromatic aberration color space is a YUV color space, a YCbCr color space, a YPbPr color space, or a (R-Y)(G-Y)(B-Y) color space.

* * * * *